United States Patent [19]

Rynbrandt

[11] Patent Number: 4,476,947

[45] Date of Patent: Oct. 16, 1984

[54] ELECTRIC CAR AND ROADWAY SYSTEM

[75] Inventor: Jay D. Rynbrandt, San Rafael, Calif.

[73] Assignee: Chevron Research Company, San Francisco, Calif.

[21] Appl. No.: 277,521

[22] Filed: Jun. 26, 1981

[51] Int. Cl.³ .............................................. B60L 9/02
[52] U.S. Cl. ....................................... 180/2.1; 191/17
[58] Field of Search .................. 180/2 R; 191/16, 17, 191/18, 19, 83, 60.2, 60.4, 49, 4, 63.2; 364/432

[56] References Cited

U.S. PATENT DOCUMENTS

| | | | |
|---|---|---|---|
| 850,117 | 4/1907 | Potter | 191/17 |
| 1,141,655 | 6/1915 | Robinson | 191/17 |
| 3,637,956 | 1/1972 | Blackman | 180/2 R |
| 3,736,484 | 5/1973 | Reynolds et al. | 180/2 R |
| 4,057,753 | 11/1977 | Perry et al. | 191/4 |
| 4,139,071 | 2/1979 | Tackett | 180/2 R |

*Primary Examiner*—David M. Mitchell
*Attorney, Agent, or Firm*—G. W. Wasson; Lewis S. Gruber; Edward J. Keeling

[57] ABSTRACT

An electrically powered vehicle transportation system including improvements in an electrified roadway system and a vehicle for operation on the roadway. The roadway is energized in response to the presence of a vehicle having certain control systems and only when that vehicle satisfies certain predetermined conditions which provide safety features for foot traffic on the roadway system. The vehicle includes means for controlling energization of the roadway in response to actions and demands within the vehicle. Automatic control means are provided to maintain the vehicle in alignment with the roadway energization system.

14 Claims, 11 Drawing Figures

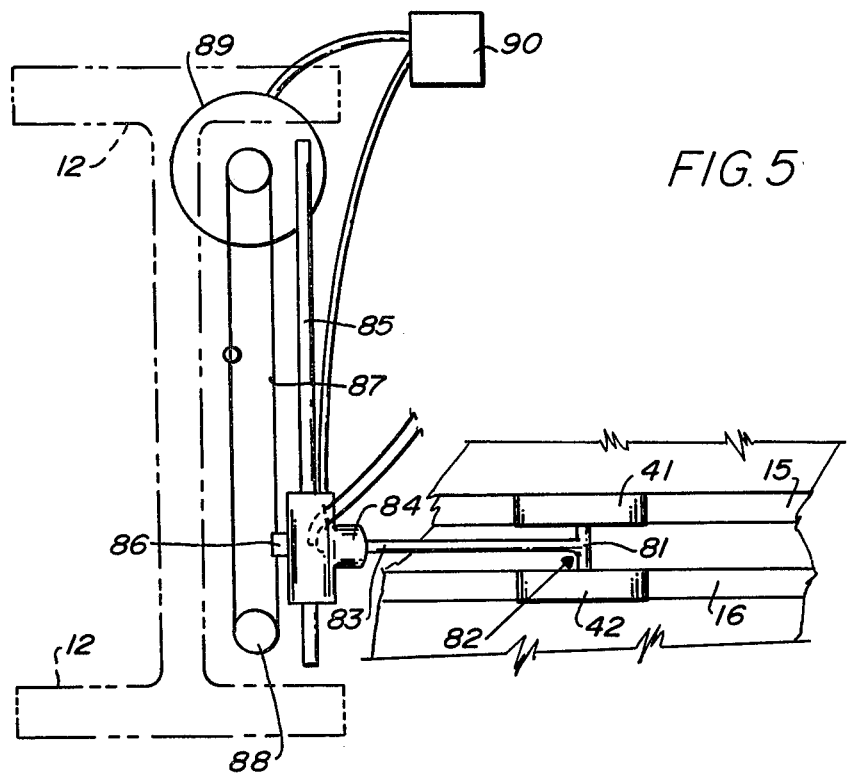
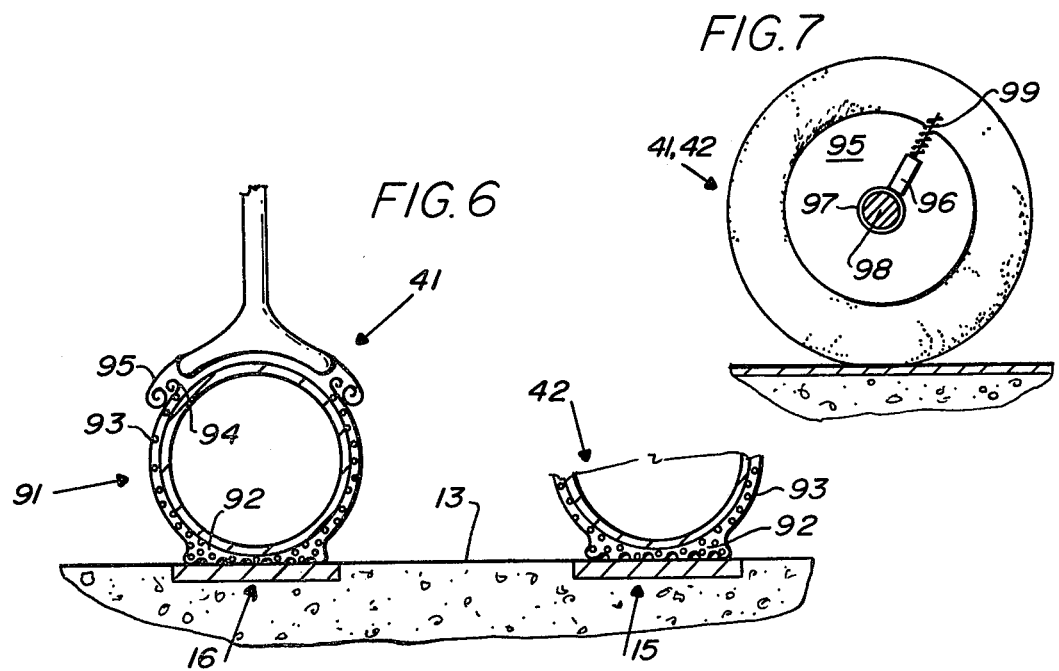

ELECTRIC CAR AND ROADWAY SYSTEM

BACKGROUND OF THE INVENTION

1. Field of the Invention

This invention relates to electrically-operated vehicle systems, and more particularly to such a system including an improved electrically-operated automotive vehicle and an electrified roadway for supplying electric current to the vehicle.

2. Prior Art

Electrically-powered automotive vehicles are well known and conventionally are powered by a storage battery pack which supplies the electrical energy for operating the vehicle on the open road, with the vehicle including charging circuitry to enable recharging of the batteries as by connection to a conventional electrical supply. Such vehicles provide low pollution, economical transportation, but generally are seriously limited in the distance they can travel between battery charges. Further, operating the vehicle on batteries alone over long operating periods between battery recharging causes substantial discharge of the batteries resulting in greatly reduced battery life as the battery cycles between charged and discharged condition.

Electrically-operated vehicles are also known which are capable of operation both from a battery pack and from an outside source of electrical power such as overhead trolley wires or energized trolley rails or tracks. However, maneuverability of such vehicles has generally been severely limited and the battery-operation has generally been intended only for a limited use such as transferring between trolley lines, turning the vehicle, or other short maneuvers. Accordingly, such vehicles have generally not been found satisfactory for general public use.

Inductive coupling between the vehicle and the roadway energization system has also been proposed; however, inherent in such a system is large and weighty coupling apparatus including conductor windings and winding cores. Overall, such a system adds substantial weight to the vehicle and is expenseive to manufacture.

Another known electrically-operated vehicle employs a battery pack for supplying the power to the electric motor drive, with an alternate, self-contained power source such as an internal combustion engine provided to drive a generator for re-charging the batteries and/or providing electrical energy to the drive motors when not operating on the batteries. While this system overcomes the inherent range limit of vehicles powered by batteries alone, the system is relatively expensive to construct, inefficient to operate, and suffers from most of the pollution problems of internal combustion engine-operated vehicles.

It is also known, for example from U.S. Pat. No. 1,859,343, to provide an electric motor-driven vehicle with electrically conductive tires which contact a series of conductors imbedded in the top surface of a roadway to complete an electric circuit beween the imbedded conductors and an overhead line which is engaged by a trolley. The vehicle is able to maneuver over the width of the roadway, within the confines of the imbedded conductors, so long as the trolley maintains electric contact with the overhead line. The patent also discloses the use of an engine-driven generator as an alternate power supply to enable the vehicle to proceed from the specially-designed roadway onto an ordinary road surface.

Another system is shown in U.S. Pat. No. 4,139,071 where an electrified traffic lane is provided with at least two spaced parallel electrical contact assemblies mounted with their top surfaces flush with the road surface and in position to be contacted one with a wheel on each side of the vehicle. The contact assemblies each requiring a predetermined weight thereon to maintain electrical contact with the vehicle wheels. The vehicle employs electrically-conductive tires which are the pickup contact with the conductors for energization of electrical motors within the vehicle. This system presents a safety hazard to potential foot traffic along the roadway in that the system can be energized by any adequate weight and remains energized when a stationary weight is on a roadway electrical contact assembly.

SUMMARY OF THE INVENTION

The object of the present invention is to provide an improved electrified transportation system including a new and improved electrically-operated automotive vehicle and electrified roadway over which the vehicle is operated. The combination of vehicle and roadway overcome the limitations of the prior art as discussed above.

Another object of the present invention is to provide an improved electrified transporation system including an improved electrified roadway over which conventinal motor vehicles may be operated with safety.

Another object of the invention is to provide an improved electrified transportation system roadway having segmented, parallel electrically-conducting surfaces which are energized only upon command of a signal voltage from a vehicle operating on the roadway and demanding power.

Another object of the present invention is to provide an improved electrically-operated motor vehicle which incorporates a battery power pack to enable operation of the vehicle on conventional road surfaces and a power take-off system for enabling the vehicle to pick up power from an electrified roadway.

Another object of the present invention is to provide an improved electrified system which includes an imbedded power strip or strips in the pathway and means for quick activation and deactivation of the power strips from a vehicle operating on the system.

In the electrified roadway and electrically-operated motor vehicle of the present invention, there are important features of both the roadway and the vehicle. Firstly, the roadway includes a pair of imbedded conductors that are separated into segments parallel to the direction of travel of the vehicle on the roadway. Each of the segments is separately energized from a supply power source and each segment is only energized when a vehicle having the necessary power take-off elements is in contact with the segment and the vehicle is demanding power from the segment. This feature provides for safety to foot traffic across the roadway in that the segments are only energized when a vehicle is demanding power from the system and the length of the segments is such that pedestrians will not be expected to be on an energized portion of the roadway surface at the same time as a vehicle is demanding power from an energized segment in that portion.

The power segments of the roadway surface are only energized when a vehicle is demanding power from the segments and, as an additional safety feature, the vehicle incorporates means which deenergize the roadway segments upon the initiation of braking, a speed change or a direction change that would indicate an abnormal activity in a moving vehicle.

The vehicle also includes means which prevent the energization to the roadway segments until the vehicle has attained a predetermined speed under its self-contained energization so that a slow moving vehicle will not be operating on and energizing the roadway system at the same time that foot traffic might potentially contact that portion of the roadway system.

The vehicle further includes a set of trolley wheels which contact the roadway segments and are movable transversely with respect to the vehicle so that the vehicle may maneuver crosswise of the roadway while traveling along the roadway and the trolley system may maintain contact with the energized roadway segments.

In the preferred embodiment of the present invention an electrically-operated automotive vehicle is provided with battery-energized electrical driving motors which may also be energized by power take-off from the roadway segments. The vehicle includes means for drawing energy from the roadway segments while at the same time controlling the energization of the roadway system both in response to vehicle speed and vehicle demand, thus providing safety features for pedestrian use from the roadway surface.

The energization control of the present invention is also useful in energizing non-roadway imbedded systems where the safety features of this invention can be applicable to electrified powering systems such as those known as "third-rail" systems.

BRIEF DESCRIPTION OF THE DRAWINGS

Further objects and features of the present invention will be readily apparent to those skilled in the art from the appended drawings and specification illustrating preferred embodiments wherein:

FIG. 5 is a plan view of the dual trolley wheel positioning mechanism for aligning the trolley wheels with the electrical conductive strips of the roadway;

FIG. 6 is a partial sectional view illustrating a form of trolley wheel for power take-off from the electrical conductive strip;

FIG. 7 is a sideview of a power take-off from the electrical conductive strip through the trolley wheels and a brush contacting a conducting ring on the wheel hub;

DESCRIPTION OF THE PREFERRED EMBODIMENTS

Figure 1:
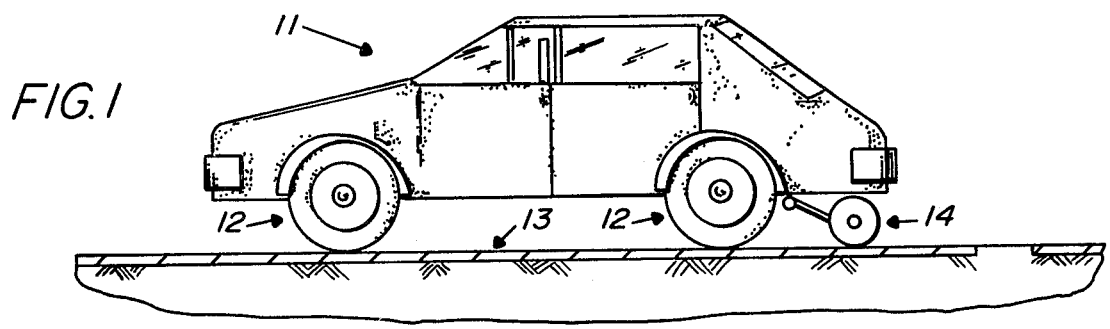
FIG. 1 is a side elevational view of a motor vehicle incorporating the features of the present invention.
Figure 2:
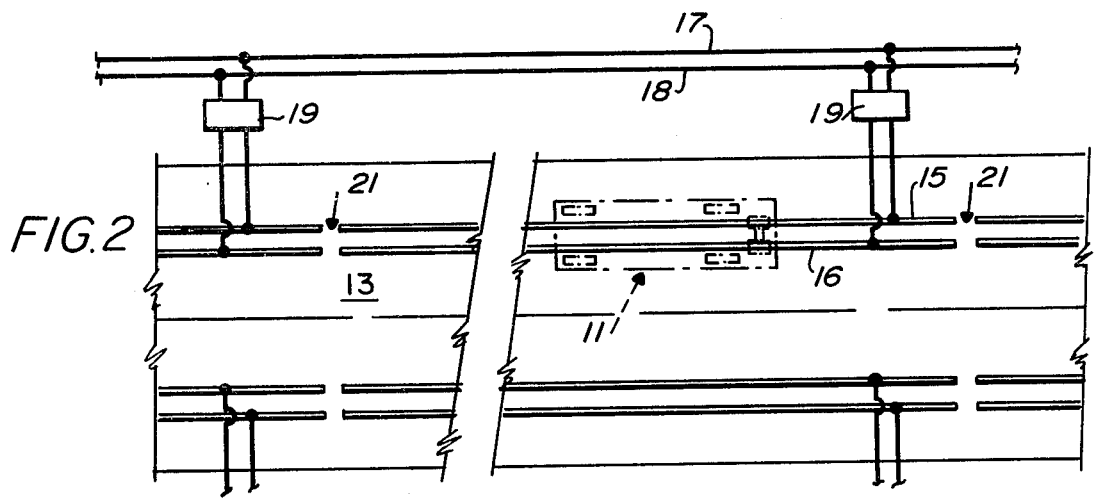
FIG. 2 is a plan view, partially schematic, illustrating the roadway surface, the electrical conductive strips, and the power bus with its control system supplying power to the roadway.

FIGS. 1 and 2 illustrate the invention as a system but not necessarily to scale. The electrically-energized motor vehicle of the present invention is designated by the reference 11. As shown, the vehicle is of a conventional form with the usual wheel system 12 for support of the vehicle above a road surface 13. A power take-off system 14 is supported beneath the vehicle 11 in a position to permit power to be derived from an energized electrical conductive system within the roadway 13.

FIG. 2 illustrates the roadway showing imbedded electrical conductive strips and the power energization to those strips. A pair of electrical conductive strips, here shown as conductors 15 and 16, are imbedded within the roadway 13 and are insulated from each other by the roadway surface. Power is supplied to the conductors from buses 17 and 18 through a controller 19. As illustrated in FIG. 2 the roadway is shown in conventional form with the travel lanes side-by-side for each direction of travel. As shown, the upper travel lane conventionally would carry traffic from right to left in the Figure and the lower traffic lane would carry traffic from left to right. Each side of the roadway would be separately energized by independent controllers in a manner which will be more fully described hereafter.

A vehicle, shown in dotted lines in FIG. 2, is in a position with respect to the electrical conductive strips 15 and 16. The paired strips 15 and 16 are installed in segments along the roadway with segments insulated from each other by electrically insulating material.

Figure 3:
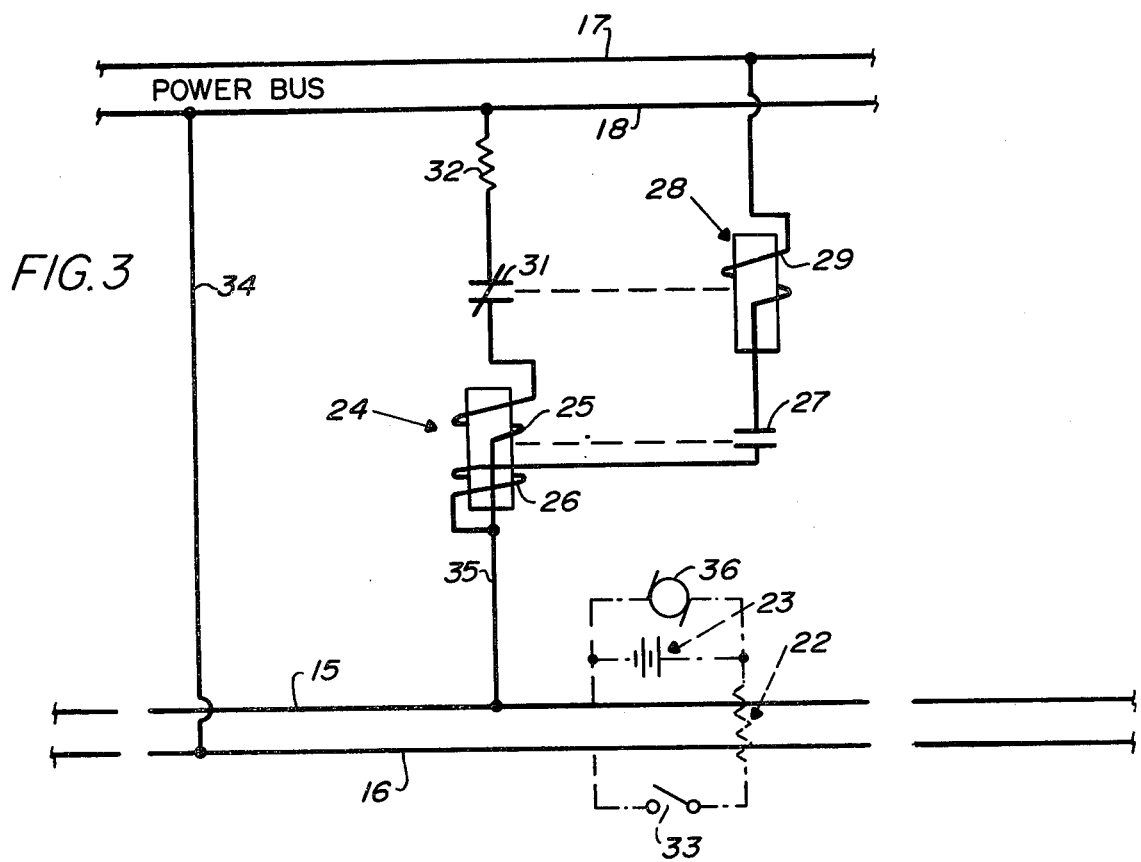
FIG. 3 is a schematic diagram of a control circuit for energization of the electrical conductive strips of the roadway from the power bus.

FIG. 3 illustrates schematically a control circuit for energization of the electrical conductive strips 15 and 16 from the buses 17 and 18. The purpose of this control circuit is to energize the strips 15 and 16 only when a vehicle (in condition to demand energization) is in contact with the strips 15 and 16. For the purpose of describing the function of the control circuit, the vehicle is represented by the electrical load 22 and source 23, shown in phantom lines, in electrical contact between strips 15 and 16. The purpose of the control circuit is to control energization of strips 15 and 16 from buses 17 and 18. The buses are continuously energized, preferably with direct current power, at a predetermined voltage for example 110 V DC. The control circuit responds to energization from the source 23 on the vehicle in a manner to supply energization from the buses to the strips.

The control circuit of FIG. 3 includes a first solenoid 24 having a pair of windings 25 and 26 with a set of normally open contacts 27 and a second solenoid 28 with a winding 29 and a set of normally closed contacts 31. The normally closed contacts 31 of solenoid 28 and resistor 32 are in series with winding 25 of solenoid 24 and are connected to conductive strip 15 in the roadway at one end and to bus 18 at the other end. Normally open contacts 27 are in series with winding 26 of solenoid 24 and winding 29 of solenoid 28 in a circuit connected between conductive strip 15 at one end and bus 17 at the other end.

The function of the FIG. 3 control circuit is to control energization of the conductive strips 15 and 16 from buses 17 and 18 in response to a signal from a vehicle on the roadway. When a vehicle 11, as represented by load 22 and source 23, is in contact with both conductive strips 15 and 16, it may be in four possible conditions, i.e. (1) at standstill (not demanding power); (2) moving at slow speed (not demanding power); (3) moving at higher speed (demanding power); and (4) moving at higher speed but not demanding power, for instance "braking". Considering first the standstill conditions, the vehicle includes a normally open accelerator pedal switch 33. When the vehicle is at standstill, switch 33 is open and no signal voltage is applied to strips 15 and 16. When the vehicle is to be moved, the accelerator switch 33 is closed and the motor 36 of the vehicle is energized by battery 23 within the vehicle so as to permit the vehicle to move along the roadway surface. When the vehicle has attained a speed (predetermined by system design specifications as a speed related to safety considerations for potential foot traffic on the roadway) the energization of the vehicle motor 36 is transferred from the onboard battery to the energized strips 15 and 16. The method of accomplishing that transfer is not needed in describing the elements of FIG. 2; the method will be described hereinafter. When the transfer condition has been obtained, the signal voltage from the vehicle battery 23 is applied to conductors 15 and 16. The signal voltage generates a current through conductor 35, coil 25 of solenoid 24, contact 31, resistor 32, power bus 18 and conductor 34. Current-flow through windings 25 closes contacts 27 to energize winding 29 of solenoid 28 and thus open contacts 31. When thus energized, bus 18 is connected by conductor 34 to conductive strip 16 and bus 17 is connected through winding 29, closed contact 27, winding 26 and conductor 35 to conductive strip 15.

As will be described further later on, when the vehicle no longer demands current (as for instance by opening switch 33 or by braking in the vehicle), the circuit across strips 15 and 16 is opened and the energization for winding 26 and 29 is terminated thus opening contact 27 to interrupt the energization circuit for strips 15 and 16 and closing contact 31 and set the circuit to receive the next signal voltage. Provision is made in the circuit to assure that contact 31 does not close before contact 27 opens upon interruption of power demand. Re-energization of strips 15 and 16 then depends upon re-energization of onboard power take-off system 14, such as by vehicle demand closing of switch 33, to reinstitute the energization of winding 25 of solenoid 24 to close contact 27 and thus re-energize the conductive strips 15 and 16.

Figure 4:
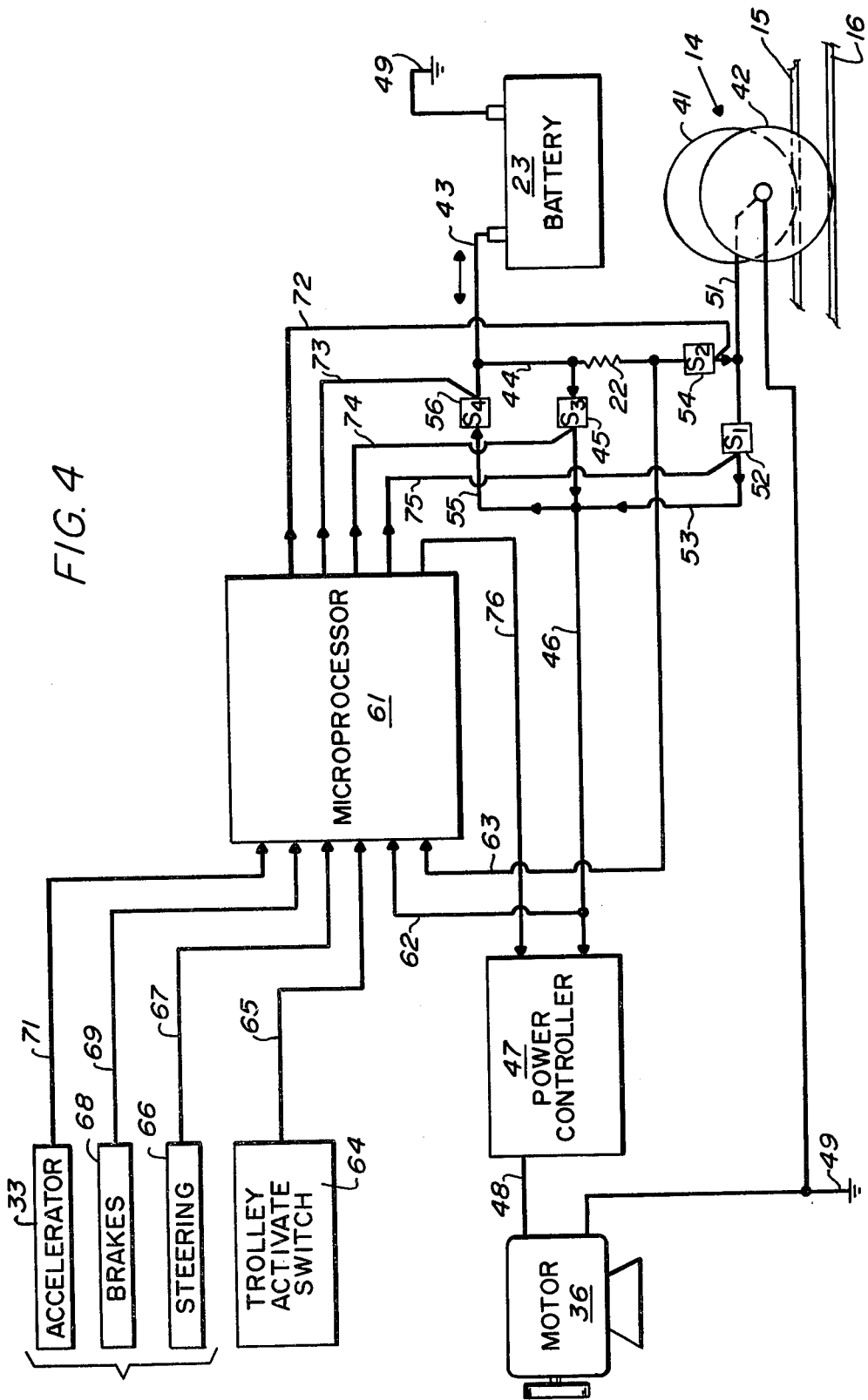
FIG. 4 is a block diagram of the motor vehicle control circuits.

FIG. 4 is a block diagram illustration of one form of control system within a vehicle for controlling energization of the electrical conductive strips 15 and 16 as described with regard to FIG. 3. The circuit of FIG. 4 is contained within the vehicle 11 and includes the power take-off system 14, here shown as a pair of conductive wheels 41 and 42 contacting electrical conductive strips 15 and 16, respectively, the drive motor 36, the battery 23, the accelerator switch 33 and additional control circuits to be now described.

Motor 36 supplies the drive power to the wheels 12 of vehicle 11. It should be understood that the illustration of a single motor 36 in FIG. 4 is intended to include the possibility of separate motors at each drive wheel and as well as a single drive motor with conventional transmission, drive shaft and differential gearing to drive wheels.

Motor 36 is energized by battery 23 through conductor 43, conductor 44, switch 45, conductor 46, power controller 47 and conductor 48. The return electrical circuit between the motor 36 and battery 23 is through the ground system 49 of the vehicle.

When conductive strips 15 and 16 are energized, as described with respect to FIG. 3, the motor 36 is energized from wheel 41 in contact with strip 15, through conductor 51 switch 52, conductor 53, conductor 46, controller 47 and conductor 48. Return is through ground 49 and wheel 42 in contact with strip 16.

The circuit of FIG. 3 which controls energization of solenoids 24 and 28 from battery 23 is shown in FIG. 4 as conductors 43 and 44, resistor 22, switch 54 and conductor 51 connected to wheel 41.

FIG. 4 also illustrates a charging circuit for battery 23 from conductive strips 15 and 16 which includes conductor 51, switch 52, conductors 53 and 55, switch 56 and conductor 43. The return circuit is through the ground system 49 and wheel 42. Recharging of battery 23 may also be accomplished as motor 36 is driven as a generator under suitable conditions, such as downhill coasting.

The energization of motor 36 with the circuit of FIG. 4 is under the control of a conventional microprocessor 61 which receives six input signals including:

a first from the battery 23 on conductor 62 from conductor 46;

a second from the junction of resistor 22 and switch 54 on conductor 63;

a third from a trolley activate switch 64 on conductor 65;

a fourth from steering control 66 on conductor 67;

a fifth from brake system 68 on conductor 69;

and a sixth from accelerator switch 33 on conductor 71.

Five output signals are supplied from the microprocessor 61 including:

a first on conductor 72 to switch 54 to control energization of the solenoids 24 and 28 as described in FIG. 3, a second on conductor 73 to switch 56 for control of the battery charging circuit, a third on conductor 74 to switch 45 to control power from battery 23 to controller 47 for motor 36, a fourth on conductor 75 to switch 52 to control energization from strips 15 and 16 to controller 47 and battery 23, and a fifth on conductor 76 for control of controller 47.

It should be apparent that the microprocessor 61 provides signals on selected pairs or groups of conductors 72–76 in accordance with the energization demands from the vehicle and interrupts signals to selected switches when demand changes or conditions change because of operation of the accelerator, brakes, steering or trolley position control. While elements 45, 52, 54 and 56 have been identified as switches, it should be understood that the term switches include the use of solid state electronic devices, such as transistors, which have an open and closed condition.

FIG. 5 illustrates one form of a means for maintaining the trolley wheels 14 in contact with the roadway energization system. As here illustrated, the wheels 41 and 42 are supported on and separated by a hub 81 at the crossbar end 82 of a T-shaped bar 83 carried in a journal 84 slidable along a rod 85. Rod 85 is supported on the under side of vehicle 11 in a manner not herein shown but in a position to be crosswise of the vehicle and about central of the vehicle as represented by the dotted lines showing wheels 12 on a suitable axle.

The journal 84 supporting bar 83 has an extension 86 attached to a cable 87 which passes over pulley 88 and is driven laterally of the vehicle by reversible motor 89. Motor 89 is energized by controller 90 in response to energization from a mechanism, to be described, which senses the position of the wheels 41 and 42 with respect to the conductive strips 15 and 16.

The purpose of the system of FIG. 5 is to maintain the wheels 41 and 42 in contact with strips 15 and 16. Whenever the wheels become misaligned with the strips, controller 90 receives an appropriate signal from suitable sensing means and supplies an energization to motor 89 to move cable 87 to position journal 84 on rod 85 to place wheels 41-42 back into alignment with the strips.

FIGS. 6 and 7 illustrate in cross-section and side elevation, respectively, the cooperation of the conductive wheels 41 and 42 with the conductive strips 15 and 16 in roadway 13. As shown in FIG. 6, wheel 42 is constructed with a tire 91 having electrical conductors 92 imbedded in its tread. The conductors 92 are connected together and are formed into the sidewall 93 and terminate in the bead 94. The bead 94 and its conductors 92 is in electrical contact with the conductive flange 95 of the wheel so as to provide the electrical connection between the vehicle and the roadway system.

FIG. 7 illustrates a form of power take-off from the wheel to the vehicle. As illustrated, a brush 96 is in contact with a conductive ring 97 on an axle 98 which is supported by suitable means within the crossbar end 82 of hub 81. The wheels 41 and 42 are rotatably supported on the axle 98 by conventional means not herein shown. Brush 96 may also transmit electrical signals through conductor 99 to the controller 90 for motor 89 (FIG. 5) as well as to the electrical control system for drive motor 36 of the vehicle (FIG. 4). The take-off system of FIG. 7 is duplicated for each wheel 41 and 42 and the conductor 99 will preferably be contained within bar 83 and journal 84.

Figure 8:
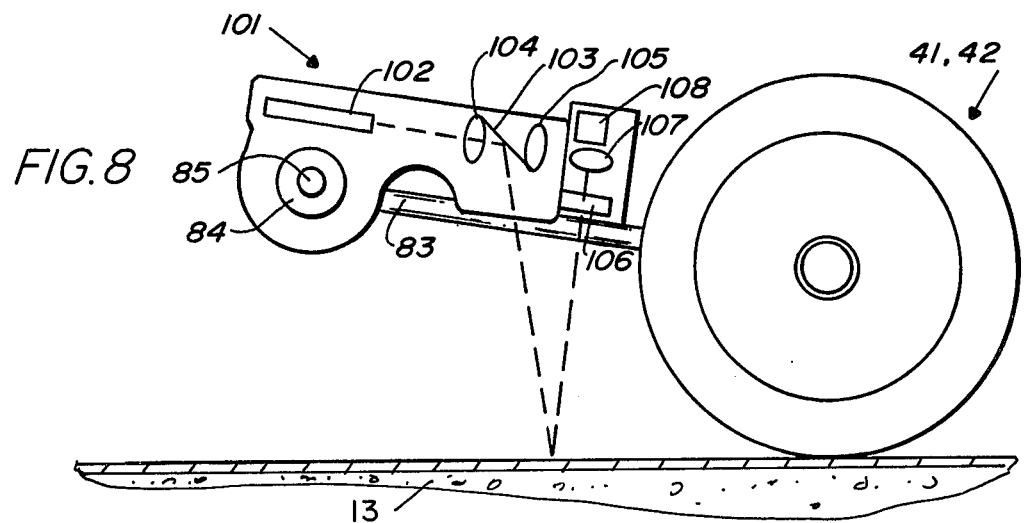
FIG. 8 is an elevational view of an optical scanning system for maintaining the trolley wheel take-offs in alignment with the electrical conducting strip in the roadway surface.
Figure 9:
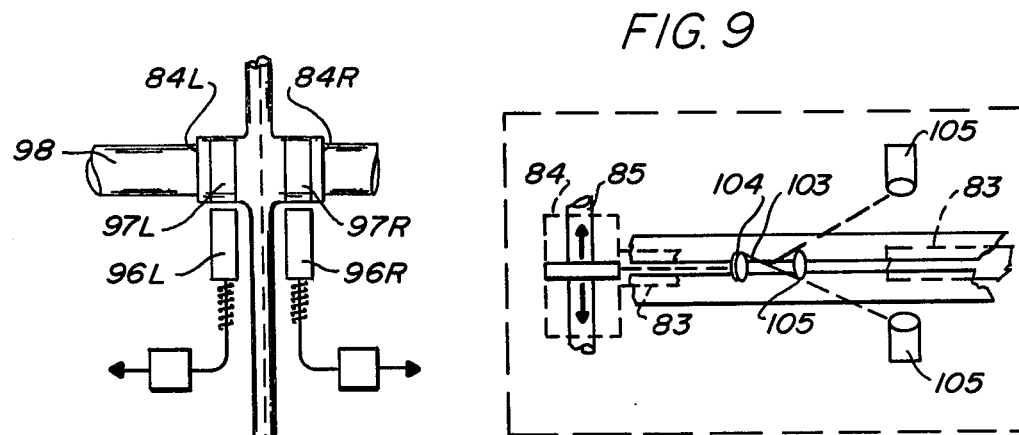
FIG. 9 is a plan view of the optical scanning system of the FIG. 8.

FIGS. 8 and 9 illustrate an alternative mechanism for maintaining alignment of the wheels 41 and 42 with the conductive strips 15 and 16. In this mechanism an optical scanning system senses the relative position of the wheel support system and the roadway strips and supplies energization to the alignment system for the wheel support system to bring the wheels into alignment with the conductive strips.

As shown in FIG. 8, the wheels 41, 42 are supported on the bar 83 fixed to the journal 84 slidable on rod 85. A housing 101 supporting an optical scanning system is supported on the journal 84. The optical scanning system includes a light source 102 and a rotating (or oscillating) mirror 103 supported in suitable bearings 104 and 105. An optical detector system including a filter 106, a lens 107 and a detector 108 is supported on the housing (or on the vehicle) in a position to receive reflected light energy from the mirror 103.

FIG. 9 illustrates the source 102 and mirror 103 with bearings 104 and 105 as well as the possible positions of detectors 105 on the housing 101 or on the vehicle.

The detector 105 produces an electrical signal dependent upon the reflection of light from source/mirror system and that output signal is supplied to the controller 90 (FIG. 5) to energize motor 89 to position the journal 84. Those familiar with the art of optical scanning systems will recognize that the use of a pair of detectors 105 will cause the controller 90 to be energized by both detectors (thus producing no energization) when the scanning system is aligned with the roadway strips. When the wheels are misaligned, the scanning system will energize only one detector and the controller 90 will be energized to cause the motor 89 to position the hub with respect to the vehicle to realign the wheels on the roadway strips.

Figure 10:
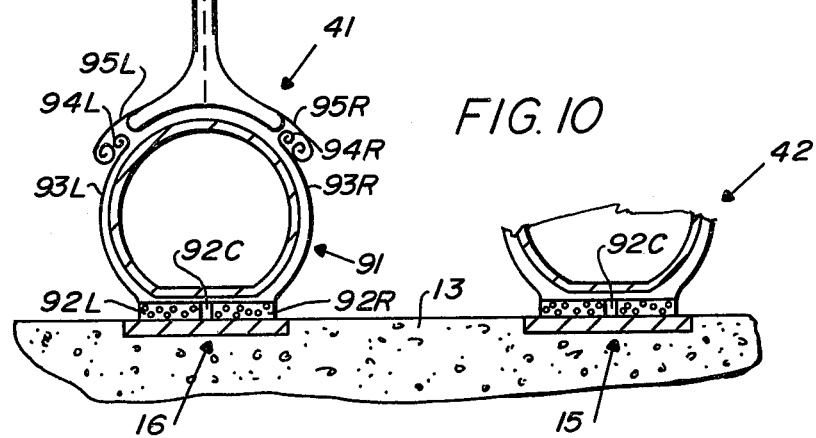
FIG. 10 is a sectional view through an alternate form of power take-off and positioning system for an electrical motor vehicle of the type of the present invention.

FIG. 10 illustrates an alternative system for alignment sensing for the conductive wheels 41-42. In this system, each wheel has a split tread and split rim with each half insulated from the other and each half producing a separate signal. The separation is perpendicular to the axis of rotation of the wheel. As shown in FIG. 10 each wheel 41 or 42 has a tire 91 with conductors 92L and 92R separated by a central space 92C at the tread surface. The conductors 92L and 92R are formed separately in the left and right sidewalls 93L and 93R where they are formed into the beads 94L and 94R and engage the flanges 95L and 95R of the wheel 41 or 42. The wheel is of a split form with each half terminating in a split hub at 81L and 81R. A pair of brushes 96L and 96R engage the split journals and withdraw signals from conductive rings 97L and 97R. The hub rotates on axle 98 and is held on the axle with conventional means not shown. Conductors 99L and 99R carry signals from the brushes 96L and 96R to separate controllers (or parts of one controller) to produce the needed signals to position the wheels.

The operation of the system illustrated in FIG. 10 is as follows. When both wheels are aligned with the conductive strips 15-16, both halves of the split wheel and hub assembly carry the same signals and no wheel alignment is necessary. This system measures the wheel-strip contact resistance of each wheel half which is inversely related to the area of contact. Thus, the system is capable of making fine adjustments in the position of the wheel long before contact is broken with either wheel half. Signals to the controllers derived from these measurements cause motor 89 to move journal 84 in the proper relative direction along the rod 85 to position the wheels.

Figure 11:
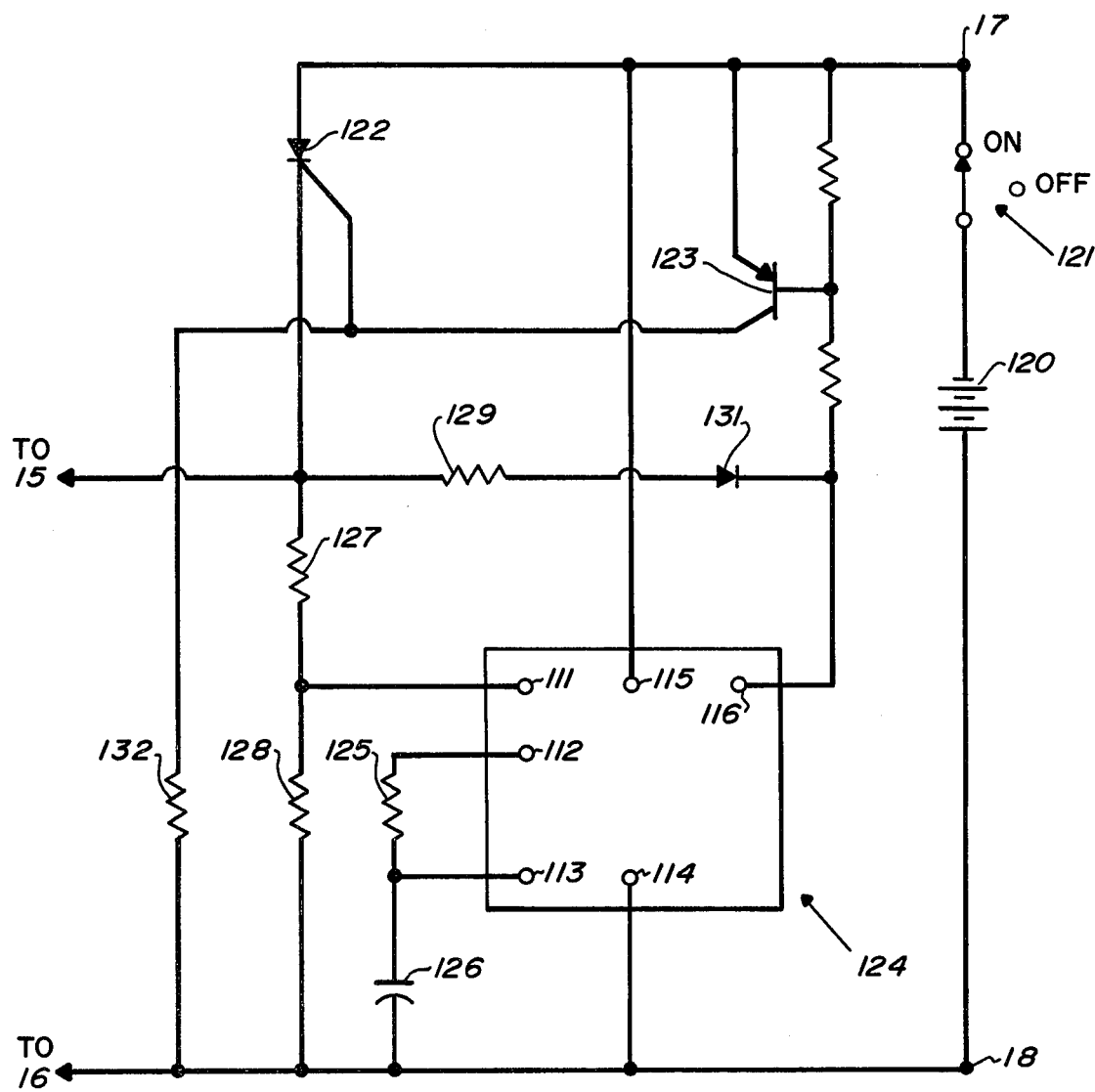
FIG. 11 is a schematic diagram of an alternative controller system between the power supply and the electrical conductive roadway strips.

FIG. 11 illustrates an alternative control circuit for the controller 19 of FIG. 2. In the circuit here illustrated solid state components and an integrated timing circuit are used to control the energization of conductive strips 15 and 16 from buses 17 and 18. The buses 17 and 18 are here shown energized from a D.C. power source 120 through a main power switch 121. Power from the source 120 to the conductive strips 15 and 16 is supplied through silicon controlled rectifier (SCR) 122. Conduction through SCR 122 is controlled by transistor 123 which is controlled by integrated circuit 124 timed by an R-C timing circuit consisting of resistor 125 and capacitor 126.

Under stand-by conditions, with power switch 121 turned to ON and no vehicle in contact with conducting strips 15 and 16, the integrated circuit 124 has full source voltage appearing between terminal 115 and 114. Terminals 111, 112 and 113 will have no voltage with respect to terminal 114, and both SCR 122 and transistor 123 are not conducting.

When a vehicle power take-off makes contact with conductive strips 15 and 16, and the onboard voltage of the vehicle is applied across series connected resistors 127 and 128 and a portion of that voltage is sensed at terminal 111 to trigger the integrated circuit. When the circuit is triggered, the voltage at terminal 116 is dropped with respect to its normal voltage and that voltage remains low for a time period determined by the timing circuit consisting of resistor 125 and capacitor 126. The reduction in voltage at terminal 116 injects a current into the base of transistor 123 causing the transistor to conduct. When transistor 123 conducts a voltage is applied to the control electrode of SCR 122 and causes it to become conductive and to apply full line voltage across conductive strips 15 and 16. The trigger pulse from terminal 116 to the base of transistor 123 continues so long as the timing circuit is conducting charging current to capacitor 126 and, while the SCR is conducting, a portion of that conducting current passes through resistor 129 and rectifier 131 to terminal 116 and the base of transistor 123 to maintain the conduction through the SCR.

When the vehicle onboard voltage is removed from conductive strips 15 and 16 on the event of braking, steering or reduced speed of the vehicle, no current is conducted into the vehicle and the current flow through resistors 127 and 128 is insufficient to maintain SCR 122 conduction. Conduction termination removes the line voltage from the conductive strips 15 and 16. Re-energization of the strips occurs, as previously described, when a vehicle is in condition to demand current and contact with the strips.

The circuit components of FIG. 11 and the operation of the integrated circuit 124 are so constructed and arranged that the energization of the conductive strips can only occur when a vehicle having an onboard power source of a substantial voltage is in contact with the strip and is in operating condition for demanding power. The FIG. 11 circuit will not be actuated by a low voltage as might occur if there was an accidental contact to the conductive strips by the accessory voltage onboard the vehicle. For example, typically the vehicles use a 12 V DC source to energize lights and accessories; the onboard power battery for the electric car of the present invention would preferably be of the order of 90 V DC. The accessory voltage would not energize the drive motor and would not trigger the energization of the FIG. 11 circuit if it were to become accidentally in contact with the conductive strips. The 90 V DC battery could energize the drive motor and could trigger the FIG. 11 circuit under the previously described conditions. The foregoing provides an additional safety feature of preventing accidental energization of the roadway conductive strips at a time when foot traffic could be on the roadway.

Having described each of the individual elements as shown in FIGS. 1 through 11, it should be apparent how the system of the present invention functions. The roadway system 13 would preferably be isolated from potential foot traffic and would be expected to be used only by vehicles operating at some reasonably high speed.

A vehicle 11 enters the system and, when attaining an appropriate initial speed, its onboard control systems actuate a roadway system, for instance of the form of FIG. 3 or of the form of FIG. 11. When so energized, the vehicle may withdraw power from the roadway energized system and use that power to drive electric motors on the vehicle to propel it down the roadway. As the vehicle travels along the roadway system, it energizes each segment of the roadway system to maintain that portion of the roadway system energized as the vehicle demands power. In the event of a braking action on the vehicle or the sudden change of direction as by steering on or off the roadway, the microprocessor of FIG. 4 causes the roadway system to become de-energized. The vehicle may then be operated under control of its onboard battery until it again is in contact and re-energizes the roadway system. Minor maneuvering along the roadway system by the vehicle within a lane of the roadway system will not interrupt energization of the system because the power take-off trolley wheels are mounted beneath the vehicle in a manner to be moved transversely of the vehicle to maintain the trolley wheels in contact with the electrically conductive roadway strips.

With particular reference to FIG. 4, when the vehicle is on the roadway system and its trolley wheels 41 and 42 are in contact with the conductive strips 15 and 16, and when the vehicle has obtained its necessary threshold speed under its own power, that is by battery 23 energizing motor 36 through power controller 47, the microprocessor 61 energizes the control system of either FIG. 3 or FIG. 11 to energize the conductive strips 15 and 16 from the power buses 17 and 18. At that time the processor 61 actuates switch 52 to supply power from the roadway system through conductor 51, 53, 46, the power controller 47 and conductor 48 to the motor 36. Power is also supplied through conductor 55 and conductor 43 to cause recharging of battery 23. Prior to the actuation of switch 52, switch 54 had been in position to energize the trolley wheels 41 and 42, the energization of the motor 36 from the battery 23 was passing through switch 45 and switch 56 was open to prevent draw of the battery power to the trolley wheels. When switch 52 is actuated, switch 45 is open and switch 56 is closed to accomplish the recharging of the battery.

Acceleration, braking or steering action controlled by accelerator 33, brakes 68 or steering 66, sends signals to the microprocessor 61 to cause it to appropriately energize or de-energize the roadway control systems. As illustrated in FIG. 4, the system is adapted to permit the trolley wheels to be removed from a roadway in the event that the vehicle is operated on an unpowered roadway. In that event the trolley activated switch 64, supplies the signal to the microprocessor 61 to cause it to be maintained in the stand-by condition.

It should be apparent from the system of the foregoing description that the roadway is maintained in a safe condition for foot traffic in that it is only energized when there is a vehicle on the roadway system that is in a operating condition and has the onboard control systems that will cause the control circuits of the power system to become energized. If a vehicle is at a slow speed or standing still along the roadway system and has onboard the necessary control equipment, it still will not energize the roadway system because of the built-in speed threshold. In that respect, the roadway is a safe place for foot traffic when the vehicles are at standstill. The roadway is, of course, unsafe for any foot traffic when vehicles are operating in full speed and, for that reason, the roadway should be restricted to vehicle traffic only.

An alternative control system for maintaining contact between the trolley means on the vehicle and the roadway segments would be a control of the vehicle steering system to move the vehicle with respect to the roadway thus maintaining the trolley means in contact with the roadway segments. The microcomputer would be appropriately programmed to recognize the difference between vehicle steering to move on or off the roadway from vehicle steering to maintain vehicle and trolley means alignment with the roadway segments.

While a certain preferred embodiment of the invention has been specifically disclosed, i.e., a conventional wheeled vehicle on a conventional roadway, it should be understood that the invention is not limited thereto as many variations will be readily apparent to those skilled in the art, i.e., a fixed pathway system with wheels normally following the pathway as well as a "third rail" system where the onboard vehicle equipment can be used to energize segments of the "third rail", and the invention is to be given its broadest possible interpretation within the terms of the following claims.

What is claimed is:

1. An electrically powered vehicle transportation system, comprising:
   a roadway having a substantially smooth outer surface;
   an electrically powered vehicle including electric propulsion means for powering said vehicle;
   an electric power strip extending longitudinally of said roadway to be substantially flush therewith, said power strip divided into a plurality of electrically isolable segments that extend a fixed distance along said roadway, said segments including at least one air of elongated laterally spaced electrical conductors;
   an electrical power supply bus;
   electric feeder means connected between said supply bus and each of said segments of supplying power thereto;
   a pair of electrical contact means mounted on said vehicle to engage said power strip for supplying power to said propulsion means, said contact means being spaced apart a distance substantially equal to the lateral spacing of said pair of electrical conductors of said segments so that said vehicle may be driven on said roadway with one of said pair of contact means in contact with one of said pair of electrical conductors and the other of said pair of contact means contacting the other of said pair of electrical conductors;
   means for determining the position of said contact means with respect to said power strip, and means for moving said contact means laterally with respect to said vehicle so as to position each of said contact means on one of said electrical conductors of said segments;
   means onboard said vehicle for applying a signal voltage through said electrical contact means to said segments as said vehicle moves from one of said segments to another; and
   voltage-sensing controller means connected in electrical circuit with each of said feeder means for controlling the supply of power to its respective segments, said controller means sensing whether a signal voltage is being applied to said segment to prevent the supply of power thereto when no signal voltage is applied and said actuator means permitting power to be supplied to said segment when a vehicle having said onboard means is present and said voltage has been applied and thereafter power is being withdrawn from said segment to said vehicle.

2. The electrically powered transportation system of claim 1 wherein said vehicle is operable on and off said roadway.

3. The electrically powered transportation system of claim 2 wherein said propulsion means comprises an electrical motor, a rechargeable storage battery for energizing said motor, and means for connecting said battery and said motor to said contact means so that said battery receives charging current and said motor is supplied power from said segments of said power strip when said contact means is receiving power from said segments.

4. The electrically powered transportation system of claim 2 wherein said electric motor is powered by said means onboard said vehicle when said vehicle is being operated off said roadway and by the power from said segments of said power strip when said vehicle is being operated on said roadway.

5. The electrically powered transportation system of claim 1 wherein said contact means comprises a trolley assembly having a pair of wheels with a resilient electrically conductive road-engaging tire mounted thereon and electrically isolated from said vehicle, the wheels being spaced apart a distance substantially equal to the lateral spacing of said pair of electrical conductors of said segments so that said vehicle may be driven on said roadway with one of said tires in contact with one of said pair of electrical conductors, the other of said tires being in contact with the other of said pair of electrical conductors.

6. An electrically powered vehicle transit system, comprising:
   a roadway having a substantially smooth surface;
   at least one pair of elongated laterally spaced parallel electrical conductors extending longitudinally of said roadway to be substantially flush therewith, said conductors being divided into a fixed number of segments that are electrically isolable from one another;
   supply conductor means connectable between a source of electrical power and each of said segments for supplying electrical energy thereto;
   a steerable electrically powered vehicle including
   (i) electric propulsion means for powering said vehicle;
   (ii) a pair of wheels each having a resilient electrically conductive road engaging tire mounted thereon, said wheels spaced apart a distance substantially equal to the lateral spacing of said electrical conductors so that said vehicle may be driven along said roadway with one of said electrically conductive tires in contact with each of said electrical conductors,
   (iii) means for determining the position of said vehicle with respect to electrical conductors and for moving said wheels laterally relative to said vehicle to position one of said electrically conductive tires in contact with each of said electrical conductors,
   (iv) means for establishing an electrical circuit between said propulsion means and said electrically conductive tires for the supply of power to said propulsion means from said electrical conductors, and
   (v) means onboard said vehicle for applying a signal voltage through said electrically conductive tires to said segments of said electrical conductors as said vehicle moves from one of said segments to another; and
   voltage-sensing controller means for each of said segments electrically connected in circuit with said supply conductor means for normally preventing the supply of power to said segments, said controller means controlling said means connectable between said source of electrical power and said segments to establish a conductive path between said supply of electrical power and said segment for supplying electrical power to said segment when said electrically conductive tires are positioned on said electrical conductors and said signal voltage has been applied thereto.

7. The electrically powered vehicle transit system of claim 6 wherein said vehicle is operable on and off said roadway.

8. The electrically powered vehicle transit system of claim 7 wherein said propulsion means includes an electric motor for powering said vehicle, a rechargeable storage battery for energizing said motor when power is not being supplied thereto from said electrical conductors, and means for disconnecting said battery from said motor when power is being supplied to said motor from said electrical conductors, said battery then receiving a charging current from said electrical conductors.

9. The electrically powered vehicle transit system of claim 6 wherein said controller means further includes a timing circuit for maintaining the conductive path between said supply of power and said segments for about 0.1 second after contact between said electrically conductive tires and said electrical conductors is broken.

10. The electrically powered vehicle transit system of claim 6 wherein said supply conductor means includes a D.C. power bus and feeder lines from said bus to each of said segments, said controller means being connected in circuit with said feeder lines.

11. The electrically powered vehicle transit system of claim 6 wherein said electrically conductive tires comprise a resilient tire molded from an electrically insulated material and having electrically conductive material molded therein to extend to the road-engaging surface of said tire.

12. The electrically powered vehicle transit system of claim 11 wherein said electrically conductive tires comprise two separated annular conductive portions on the roadway engaging surface of said tires isolated from each other by an annular ring of said electrically insulating material.

13. The system of claim 12 wherein each of said two separated annular conductive portions is connected to a separate sensing circuit for controlling movement of said means for moving said wheels laterally relative to said vehicle.

14. The electrically powered vehicle transit system of claim 6 wherein said means for determining the position of said vehicle with respect to said electrical conductors is an optical system including means onboard said vehicle for sensing reflected light from said roadway surface.

* * * * *

UNITED STATES PATENT AND TRADEMARK OFFICE
CERTIFICATE OF CORRECTION

PATENT NO. : 4,476,947
DATED : October 16, 1984
INVENTOR(S) : JAY D. RYNBRANDT

It is certified that error appears in the above–identified patent and that said Letters Patent are hereby corrected as shown below:

Column 11, line 27, "least one air of elongated laterally spaced electrical" SHOULD READ --least one pair of elongated laterally spaced electrical--.

Signed and Sealed this

Third Day of September 1985

[SEAL]

Attest:

DONALD J. QUIGG

Attesting Officer    Acting Commissioner of Patents and Trademarks - Designate